United States Patent [19]

Gutjahr

[11] Patent Number: 4,592,713
[45] Date of Patent: Jun. 3, 1986

[54] MOLD CLOSING UNIT OF AN INJECTION MOLDING MACHINE

[75] Inventor: Lothar Gutjahr, Denzlingen, Fed. Rep. of Germany

[73] Assignee: Klöckner-Werke Aktiengesellschaft, Duisburg, Fed. Rep. of Germany

[21] Appl. No.: 636,717

[22] Filed: Aug. 1, 1984

[30] Foreign Application Priority Data

Aug. 3, 1983 [DE] Fed. Rep. of Germany ....... 3327935

[51] Int. Cl.⁴ .......................................... B29C 45/68
[52] U.S. Cl. .................................. 425/150; 264/40.5; 425/451.2; 425/590; 425/DIG. 223
[58] Field of Search ............... 425/150, 450.1, 451.2, 425/451.3, 451.5, 451.7, 589, 590, 592, DIG. 223, 135, 149; 264/40.5; 91/35, 380

[56] References Cited

U.S. PATENT DOCUMENTS

| | | | |
|---|---|---|---|
| 3,564,659 | 2/1971 | Koch et al. | 425/149 |
| 3,677,685 | 7/1972 | Aoki | 425/450.1 |
| 3,797,364 | 3/1974 | Schulze | 91/35 |
| 3,825,235 | 7/1974 | Schwertfeger et al. | 425/145 |
| 3,857,658 | 12/1974 | Muzsnay | 425/145 |
| 3,940,930 | 3/1976 | Rosander | 425/450.1 |
| 3,941,534 | 3/1976 | Hunkar | 425/145 |
| 4,009,983 | 3/1977 | Jacobs | 425/451.2 |
| 4,253,358 | 3/1981 | Schulze | 82/5 |
| 4,540,359 | 9/1985 | Yamazaki | 425/135 |

FOREIGN PATENT DOCUMENTS

| | | |
|---|---|---|
| 2112701 | 9/1972 | Fed. Rep. of Germany ... 425/451.2 |
| 3032407 | 8/1980 | Fed. Rep. of Germany . |
| 56-99644 | 8/1981 | Japan . |

OTHER PUBLICATIONS

Berger Lahr, entitled "DIVI-STEP Type SST 088/SST 093".
Hartmann and Laemmle KG, entitled "Electro-Hydraulic Linear Amplifiers LVS, 10th Edition 1977.

Primary Examiner—Jay H. Woo
Assistant Examiner—J. Fortenberry
Attorney, Agent, or Firm—Watson, Cole, Grindle & Watson

[57] ABSTRACT

A mold closing unit has a multi-way valve in a hydraulic supply line leading to a hydraulic traveling cylinder which is controlled as a function of a speed pattern specified for the movable mold clamping plate. The valve body of this multi-way valve is arranged on an elongated, threaded rotatable spindle in an axially movable manner. The spindle is connected with a stepping motor which is controlled as a function of the speed pattern. As soon as the movable mold clamping plate has reached a predetermined distance from the stationary mold clamping plate, the stepping motor is switched to a higher number of steps per revolution and the mold is closed below the creep rate.

1 Claim, 1 Drawing Figure

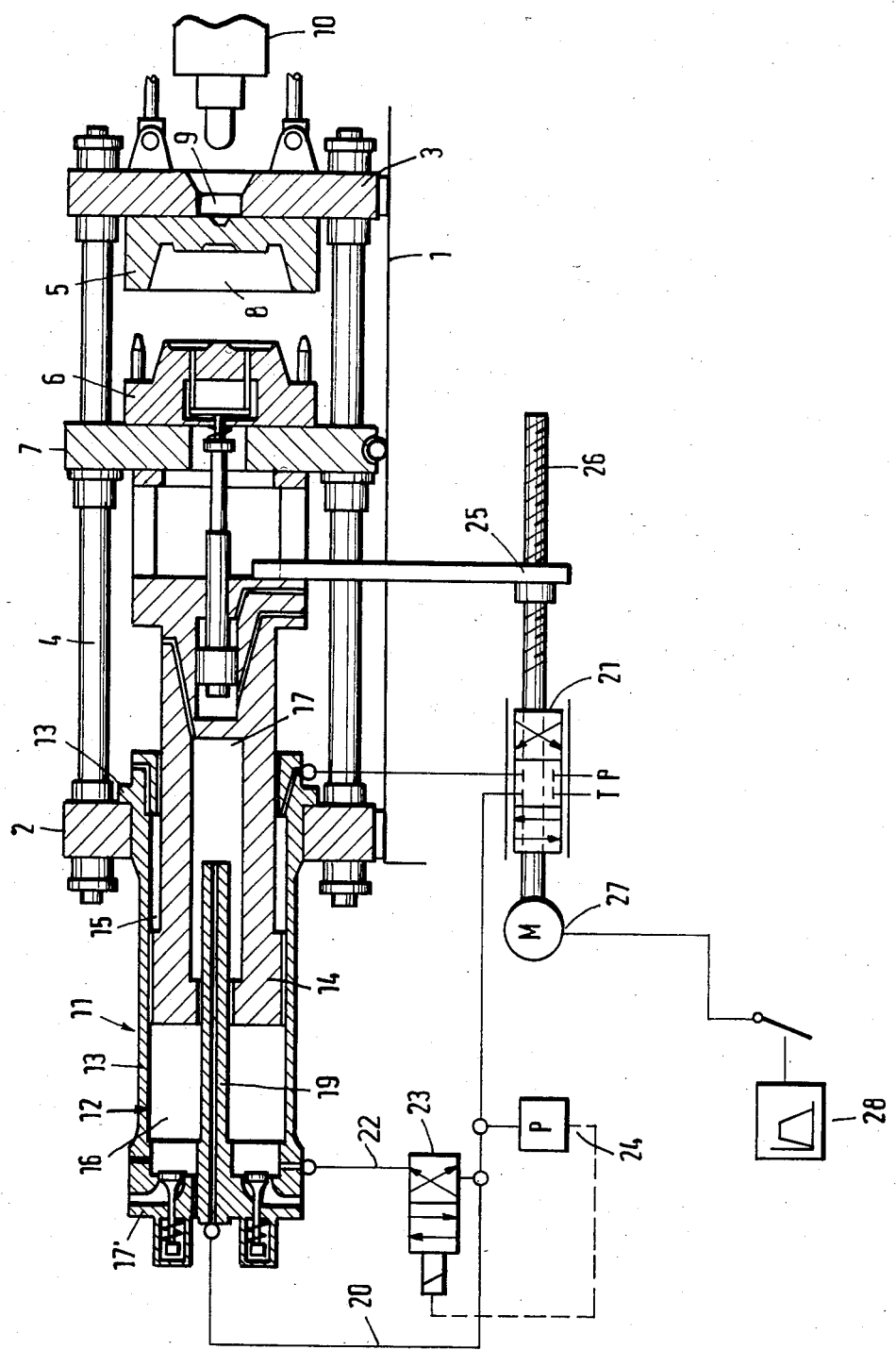

MOLD CLOSING UNIT OF AN INJECTION MOLDING MACHINE

RELATED APPLICATIONS

This application relates to U.S. application Ser. No. 463,112, filed Feb. 2, 1983, and to U.S. application Ser. Nos. 636,722 and 636,723 filed concurrently herewith as respectively based on West German patent application Nos. P 3327936.5-16 and P 3327937.3-16, filed Aug. 3, 1983.

BACKGROUND OF THE INVENTION

This invention relates to a mold closing unit of an injection molding machine which includes a stationary mold clamping plate and a movable mold clamping plate slidable along parallel guide rods relative to the stationary plate, movable and fixed dies affixed to the respective plates. The mold closing unit includes a fixed, hydraulic mold closure retention cylinder, and a hydraulic traveling cylinder which includes a piston operable within the retention cylinder and being connected to the movable die. A multi-way valve is arranged in a supply line connected with the traveling cylinder, the valve being controllable for the operation of a speed pattern specified for the movable mold clamping plate.

When closing an injection mold from its open final position, i.e. at a maximum distance between the mold clamping plates, a maximum pressure acts on the traveling cylinder, and the movable mold clamping plate, with one-half the injection mold die affixed thereon, is initially accelerated and then decelerated in such a manner that the injection mold is closed at a reduced speed. The deceleration of the movable mold clamping plate is effected in such a manner that the last phase of the closing of the injection mold is effected below a predetermined creep rate. In general, the time for one injection cycle is attempted to be maintained as short as possible, i.e. the time for the production of a molded part. Thus, the movable mold clamping plate at its maximum mold opening width is given, as quickly as possible, its maximum speed from its open position, and deceleration must be effected within such a short time that the closing of the injection mold below the creep rate is still possible.

In published West German patent application No. 30 32 407, this deceleration is carried out particularly in the last phase of the closing in such a manner that deceleration is effected as a function of the kinetic energy of the movable mold clamping plate and of the movable die half affixed thereto. Since this kinetic energy is dependent on the mass of the movable mold clamping plate and of the clamped half of the mold, and since the mass of the clamped half of the mold may vary for different injection molds, such factors must be taken into account. This is accomplished by the design of the electronic circuitry which takes into consideration the injection mold half to be clamped for a given injection molding operation, so that an envelope curve takes its course, so-to-speak, electronically with a quadratic delay so that a closing below the creep rate is assured, even after a mold change. However, the technical complexity is considerable for such mold closing units so that they are generally only used for injection molding machines.

SUMMARY OF THE INVENTION

It is therefore an object to provide a mold closing unit of the aforementioned type which ensures that the mold closing position is reached below the creep rate of travel without having to take into account a possible change in kinetic energy.

Specifically, the mold closing unit according to the invention includes the provision of an elongated, threaded rotatable spindle threadedly connected to the movable mold clamping plate, the valve body of a 4/2-way valve being mounted on therewith the spindle for axial movement thereon, and a stepping motor connected with the spindle for rotation thereof. The stepping motor is capable of operation at a specified speed pattern, and can be switched to an increased number of steps per revolution during mold closing when the movable mold clamping plate reaches a predetermined distance from the stationary mold clamping plate. Thus, a precise and predetermined speed pattern is effected for the movable mold clamping plate and its clamped half of the die mold, independently of the mass of the clamped half of the mold. And, independently of the mass of the clamped half of the mold, the mold is closed while maintaining a specified creep rate of travel. When closing the mold, the stepping motor rotates the spindle whereby the valve body of the multi-way valve is accordingly shifted axially at the same time and opens an essentially large passage section for the hydraulic operating medium so that it can act accordingly on the traveling cylinder to effect a corresponding movement of the movable mold clamping plate. This results in a corresponding oppositely directed movement of the valve body and the spindle which is again counteracted by the stepping motor in accordance with the specified speed pattern. In such manner, a hydraulically rigid, coupled-back control path is formed with the result that the movement of the movable mold clamping plate is controlled at optimal accuracy which depends essentially on the accuracy of the spindle.

Hydraulic components which operate in accordance with this principle of hydraulically rigid back-coupling are disclosed in a publication of Hartmann and Laemmle KG, entitled "Electro-Hydraulic Linear Amplifier LVS, 10th edition 1977. These components have, however, only been employed for the exact positioning of machine parts which are movable on machine tools.

Also, it is known from a prior publication of Berger Lahr, entitled "DIVI-STEP Type SST 088/SST 093" to change over the step angle of stepping motors, i.e., for example, from 10,000 steps per revolution to 1,000 steps per revolution, either up or down. However, it is generally considered to be a disadvantage to effect the positioning of machine parts with such a high number of steps since, even though this increases the positioning accuracy, the speed is reduced but at the expense of increased costs for the electronic system of the stepping motor toward high frequencies. It is this disadvantage which is utilized by the invention by essentially effecting, after the mold closing safety point has been reached, a switch-over to a higher number of steps per revolution which, owing to the designed rigid hydraulic control path, has the advantage that the movable mold clamping plate is forced in such manner to move into a closing position of the injection mold with a specified closing speed independently of the mass of the clamped half of the mold. What is essential to the invention is that the independence achieved for changes in the mass of the clamped half of the mold by means of the rigid hydraulic back-coupling approach employed.

BRIEF DESCRIPTION OF THE DRAWING

The single drawing FIGURE is a longitudinal sectional view of an injection molding machine which incorporates the mold closing unit of the invention.

DETAILED DESCRIPTION OF THE INVENTION

The injection molding machine, with which the mold closing unit of the invention is associated, includes a support bed 1 on which a pair of spaced, parallel support plates 2 and 3 are fixedly mounted and are interconnected by a plurality of guide rods 4 lying parallel to the central axis of the plates. Support plate 3 defines a stationary mold clamping plate on which one-half 5 (fixed die) of a divided injection mold is clamped while the other half 6 of the mold (movable die) is clamped on a movable mold clamping plate 7 mounted on rods 4 for sliding movement therealong. In a closed position, the two halves of the mold enclose a die mold cavity or nest 8 as in a normal manner into which plastic material is inserted through a sprue hole 9 via an injection unit 10.

A mold closing unit, generally designated 11, is arranged outwardly of the movable mold clamping plate. This unit comprises a mold closure retention cylinder, generally designated 12, having a cylinder 13 affixed at its inner end to support plate 2. A piston 14 of the mold closing unit is acted upon on opposite sides through pressure chambers 15 and 16. The piston rod of piston 14 is connected to movable mold clamping plate 7. And, the piston rod is hollow so as to define a pressure chamber 17 into which a hollow tubular rod 19 extends in a telescoping manner. Rod 19 is rigidly connected to a front plate 17' of cylinder 13. The rod and cylinder 13 have connection for a pressure line 20 which is connected with a 4/2-way valve 21 through which a hydraulic operating medium can be supplied and discharged. Piston 14, its piston rod and rod 19 define a traveling cylinder such that, upon pressurization of chamber 17, the piston is extended out of its clinder 13, and upon pressurization of chamber 15, the piston is retracted with its cylinder 13. Another multi-way valve 23, which is connected with pressure chamber 16 of the mold closing cylinder, is arranged on a branch line 22 of the supply line, the branch line interconnecting chamber 16 with the 4/2-way valve.

The valve body of 4/2-way valve 21 is mounted on an elongated, threaded rotatable spindle 26 which extends through the valve body of valve 21, the valve being movable in an axial direction together with the spindle. The spindle is threadedly connected to the movable mold clamping plate via a bar 25 having a spindle nut thereon through which the spindle extends, and is coupled with a stepping motor 27 which is controllable as a function of the speed of the movable mold clamping plate in accordance with a specified program. The values are stored as a function of the path covered by the movable mold clamping plate. This is schematically shown by a memory 28.

Thus, during the mold closing operation, and when the movable mold clamping plate reaches a predetermined distance from the stationary mold clamping plate, the number of steps of revolution of the stepping motor is increased by the memory whereby the closing speed is automatically reduced. Owing to the designed rigid hydraulic back-coupling and because of the extreme accuracy of the stepping motor, it is always assured that the mold is closed below the creep rate irrespective of changes in length of guide rods 4, etc. Accordingly, the number of steps of revolution is reduced as far as possible with the opening of the mold so that the stepping motor permits the opening of the mold at a maximum speed. In this context, the arrangement can also be such that the stepping motor is uncoupled from the 4/2-way valve 21 which is controlled in a known manner.

Obviously, many modifications and variations of the present invention are made possible in the light of the above teachings. It is therefore to be understood that within the scope of the appended claim the invention may be practiced otherwise than as specifically described.

What is claimed is:

1. A mold closing unit of an injection molding machine which includes a stationary mold clamping plate and a movable mold clamping plate slidable along parallel guide rods relative to said stationary plate, a movable die affixed to said movable plate, a mating fixed die affixed to said stationary plate and confronting said movable die, the unit comprising a fixed, hydraulic mold closure retention cylinder, and a hydraulic traveling cylinder including a piston operable within said retention cylinder and defining therewith on opposite sides of said piston first and second pressure chambers for respectively retracting and extending said piston, said piston being connected to said movable die, and said piston being hollow so as to define a third pressure chamber, means for operating said unit comprising a hydraulic supply line connected with said first and third chambers, said supply line having a branch line leading to said second chamber, a linear amplifier having rigid hydraulically fixed feedback and comprising a multi-way valve arranged in said supply line for axial movement to control the flow of hydraulic fluid through said supply line and said branch line for closing and opening said movable die, said valve being controllable for the operation of a speed pattern specified for said movable clamping plate, an elongated threaded rotatable spindle threadedly connected with said movable mold clamping plate for axial displacement relative thereto upon rotation of said spindle, said valve being a 4/2-way valve having a valve body on said spindle for axial movement therewith upon spindle rotation, and a stepping motor coupled with said spindle for rotation thereof, said stepping motor being controllable as a function of a predetermined closing speed pattern, whereby rotation of said spindle effects the movement of said 4/2-way valve to control the flow of hydraulic fluid, the movement of said movable die effecting an oppositely directed movement of said valve via said spindle which is counteracted by said motor, and said stepping motor being switchable to an increased number of steps per revolution during mold closing when said movable plate reaches a predetermined distance from said stationary plate for slowing down the mold closing to a specified creep rate before the mold is completely closed so that the mold is closed at said creep rate, independently of the mass of said movable die and of said movable mold clamping plate.

* * * * *